(12) United States Patent
Kanai et al.

(10) Patent No.: US 7,358,002 B2
(45) Date of Patent: *Apr. 15, 2008

(54) EXHAUST GAS PROCESSING DEVICE FOR FUEL CELL

(75) Inventors: Yasushi Kanai, Wako (JP); Hideo Numata, Wako (JP); Akio Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 686 days.

This patent is subject to a terminal disclaimer.

(21) Appl. No.: 10/688,761

(22) Filed: Oct. 16, 2003

(65) Prior Publication Data

US 2004/0106021 A1 Jun. 3, 2004

(30) Foreign Application Priority Data

Oct. 17, 2002 (JP) ............................. 2002-302739
Mar. 17, 2003 (JP) ............................. 2003-071221

(51) Int. Cl.
- H01M 8/04 (2006.01)
- H01M 2/00 (2006.01)
- B01F 5/00 (2006.01)

(52) U.S. Cl. .................... 429/22; 429/34; 422/224
(58) Field of Classification Search ............. None
See application file for complete search history.

(56) References Cited

U.S. PATENT DOCUMENTS 6,426,158 B1 7/2002 Pratt et al.
6,916,563 B2 * 7/2005 Yamamoto et al. ........... 429/17
6,926,987 B2 * 8/2005 Blaszczyk et al. ............ 429/34
2002/0094469 A1 7/2002 Yoshizumi et al.
2004/0062975 A1 * 4/2004 Yamamoto et al. ........... 429/34

FOREIGN PATENT DOCUMENTS

| JP | 60-207255 | * 10/1985 |
| JP | 06-275300 | 9/1994 |
| JP | 11-191422 | 7/1999 |
| JP | 2001-281393 | 10/2001 |
| JP | 2004-6183 | 1/2004 |

OTHER PUBLICATIONS

IPDL JPO Machine Translation for JP 60-207255 A (publication date Oct. 18, 1985).*
Japanese Office Action for Application No. 2003-071221, dated Jul. 19, 2007.

* cited by examiner

Primary Examiner—Patrick Joseph Ryan
Assistant Examiner—Karie O'Neill
(74) Attorney, Agent, or Firm—Lahive & Cockfield, LLP; Anthony A. Laurentano, Esq.

(57) ABSTRACT

An exhaust gas processing device for a fuel cell is disclosed. In the exhaust gas processing device, hydrogen gas purged from the fuel cell is mixed with cathode exhaust gas from the fuel cell and diluted prior to being discharged to an atmosphere. The exhaust gas processing device includes a reservoir in which purged hydrogen gas from the fuel cell is retained and mixed with cathode exhaust gas from the fuel cell, and an agitating gas introduction inlet provided at an upper part of the reservoir. The purged hydrogen gas is mixed with and diluted by agitating gas introduced from the agitating gas introduction inlet.

18 Claims, 7 Drawing Sheets

EXHAUST GAS PROCESSING DEVICE FOR FUEL CELL

BACKGROUND OF THE INVENTION

The present invention relates to an exhaust gas processing device for a fuel cell, and more particularly to an exhaust gas processing device for a fuel cell, which processes hydrogen purged from a fuel cell system where hydrogen is utilized as a fuel for a power source of an electric vehicle.

In general, a fuel cell defines the cathode and the anode at both ends of a proton exchange membrane or polymer electrolyte membrane (PEM membrane) so that oxygen in the air is supplied to the cathode while hydrogen contained in a fuel gas is supplied to the anode to thereby generate electricity by the electrochemical reaction therebetween.

In a fuel cell system using such a fuel cell as a power source for an electric vehicle, and in cases, for example, where pure hydrogen (herein after simply referred to "hydrogen") is used as fuel, a recirculation system is adopted for the purpose of improving utilization efficiency of hydrogen to be supplied to the fuel cell and thereby improving fuel economy. For example, Japanese Laid-open Patent Application No.6-275300 (see Page 4 and FIG. 1) discloses such a recirculation system. To recirculate hydrogen, the recirculation system may be provided with an ejector which generates negative pressure for sucking hydrogen or a vacuum pump.

During long-term recirculation of hydrogen, the concentration of impurities such as nitrogen increases in the recirculation system, leading to deterioration in generation efficiency. Also, moisture retained in the fuel cell system makes a flow of hydrogen clogged in the anode pipe system. For this reason, purging is required to discharge impurities such as nitrogen and water to the atmosphere. However, because hydrogen is filled in the anode pipe system, high concentration hydrogen is also discharged to the external during the purging. In order to prevent hydrogen (purged hydrogen) from being discharged to the atmosphere, purged hydrogen is introduced into an exhaust fuel diluter and mixed with cathode exhaust gas. Therefore, purged hydrogen is diluted to a lower concentration and then discharged to the atmosphere.

Japanese Laid-open Patent Application No.11-191422 (column [0024] and FIG. 2) discloses a technique wherein hydrogen discharged from the fuel cell is mixed with air in an exhaust fuel diluter and diluted hydrogen is discharged to the atmosphere.

However, in a case where purged hydrogen that is discharged to the atmosphere is intermittently fed to the exhaust fuel diluter, because the concentration fluctuation of purged hydrogen in the exhaust fuel diluter becomes greater with elapse of the time, the concentration fluctuation of purged hydrogen that is mixed with cathode exhaust gas and diluted prior to being discharged to the atmosphere also becomes greater.

In this regard, even in a case where purged hydrogen that is discharged to the atmosphere is introduced intermittently into the exhaust fuel diluter, it is desired that the concentration fluctuation of the purged hydrogen does not become greater with elapse of the time.

It is also desired that the hydrogen concentration in emission gas is highly accurately controlled to exert the inherent performance of the exhaust fuel diluter in order to keep the hydrogen concentration in the emission gas that is discharged from the exhaust fuel diluter to the atmosphere not greater than a predetermined limit value and to dilute and process as much purged hydrogen as possible.

SUMMARY OF THE INVENTION

In view of the above, according to a first aspect of the present invention, there is provided an exhaust gas processing device for a fuel cell, in which hydrogen gas purged from the fuel cell is mixed with cathode exhaust gas from the fuel cell and diluted prior to being discharged to an atmosphere. The exhaust gas processing device includes: a reservoir in which purged hydrogen gas from the fuel cell is retained and mixed with cathode exhaust gas from the fuel cell; and an agitating gas introduction inlet provided at an upper part of the reservoir. The purged hydrogen gas is mixed with and diluted by agitating gas introduced from the agitating gas introduction inlet.

With this construction of the exhaust gas processing device, agitating gas with a relatively high specific gravity, such as cathode gas and cathode exhaust gas, is introduced from the agitating gas introduction inlet provided at an upper part of the reservoir against purged hydrogen with a low specific gravity that is likely to flow upward of the reservoir. Therefore, purged hydrogen and agitating gas are agitated and mixed together in a reliable manner.

According to a second aspect of the present invention, there is provided an exhaust gas processing device for a fuel cell, in which hydrogen gas purged from the fuel cell is mixed with cathode exhaust gas from the fuel cell and diluted prior to being discharged to an atmosphere. The exhaust gas processing device includes: a reservoir having an inlet through which purged hydrogen gas from the fuel cell is introduced into the reservoir and then mixed with cathode exhaust gas from the fuel cell; and an agitating gas introduction inlet provided at an upper part of the reservoir. Cathode exhaust gas to be supplied to the fuel cell is branched off and then supplied to the agitating gas introduction inlet.

With this construction of the exhaust gas processing device, anode gas that is temporally retained in the reservoir is mixed with and diluted by cathode exhaust gas that is fed to the reservoir, so that the concentration fluctuation within the reservoir becomes smaller. This results in small concentration change of anode gas that is mixed with and diluted by cathode exhaust gas and then discharged to the atmosphere.

Further, cathode gas with a relatively high specific gravity is introduced from the agitating gas introduction inlet provided at an upper part of the reservoir, so that the cathode gas flows downward toward a lower part of the reservoir. Therefore, the cathode gas is mixed with hydrogen with a low specific gravity that is likely to flow upward of the reservoir.

According to a third aspect of the present invention, there is provided an exhaust gas processing device for a fuel cell including: an exhaust fuel diluter having a reservoir in which hydrogen gas purged from the fuel cell is retained and then mixed with cathode exhaust gas from the fuel cell and diluted prior to being discharged to an atmosphere; an agitating gas pipe for introducing agitating gas which agitates the hydrogen gas retained in the reservoir; an adjustment valve for adjusting an amount of agitating gas; a hydrogen concentration detector for detecting a hydrogen concentration of emission gas discharged to the atmosphere; and a controller for adjusting the adjustment valve based on a detection signal from the hydrogen concentration detector.

With this construction of the exhaust gas processing device, when hydrogen gas retained in the reservoir is mixed with cathode exhaust gas and discharged to the external, the hydrogen concentration detector detects the hydrogen concentration of the emission gas. The controller then controls the adjustment valve based on a detection signal transmitted from the hydrogen concentration detector so as to increase or decrease the amount of agitating gas, thereby adjusting the amount of hydrogen contained in the emission gas. To be more specific, with increased amount of agitating gas hydrogen retained at the upper part of the reservoir is agitated to increase the amount of hydrogen contained in the emission gas. Meanwhile, with decreased amount of agitating gas the amount of hydrogen that is being agitated and is likely to flow upward of the reservoir is increased, so that the amount of hydrogen contained in the emission gas is decreased.

In the aforementioned exhaust gas processing device according to the third aspect of the present invention, the controller controls a flow rate adjusting means to increase the amount of cathode exhaust gas in a case where the amount of agitating gas to be supplied to the exhaust fuel diluter is not greater than a lower limit value and the hydrogen concentration is determined to be higher than a predetermined value.

Herein, the term "flow rate adjusting means" indicates, for example, a compressor which can feed air in accordance with the rotational speed or a flow regulating valve which can adjust the flow rate.

With this construction of the exhaust gas processing device, for example, in a case where the amount of agitating gas is decreased to decrease the amount of hydrogen contained in the emission gas because the hydrogen concentration detected by the hydrogen concentration detector is high, if it is impossible to decrease the amount of agitating gas any longer, that is, in a condition equal to or lower than the lower limit value, the controller controls the flow rate adjusting means to increase the amount of cathode exhaust gas.

According to a fourth aspect of the present invention, there is provided an exhaust gas processing device for a fuel cell including: an exhaust fuel diluter having a reservoir in which hydrogen gas purged from the fuel cell is retained and then mixed with cathode exhaust gas from the fuel cell and diluted prior to being discharged to an atmosphere; an agitating gas pipe for introducing agitating gas which agitates the hydrogen gas retained in the reservoir; and an adjustment valve for adjusting an amount of agitating gas. An introduction of agitating gas is controlled in response to an execution of purging from the fuel cell.

With this construction of the exhaust gas processing device, when hydrogen is purged from the fuel cell, an introduction of agitating gas into the reservoir is controlled in response to the execution of purging. For example, if the adjustment valve is controlled to be closes in response to the execution of purging, the pressure within the reservoir lowers equal to or lower than a predetermined value, so that purged hydrogen is sufficiently drawn into the reservoir.

Other features and advantages of the present invention will be apparent from the following description taken in connection with the accompanying drawings.

BRIEF DESCRIPTION OF THE DRAWINGS

Preferred embodiments of the present invention will be described below, by way of example only, with reference to the accompanying drawings, in which.

DETAILED DESCRIPTION OF THE INVENTION

With reference to the accompanying drawings, preferred embodiments of an exhaust gas processing device for a fuel cell according to the present invention will be described.

First Embodiment

Figure 1:
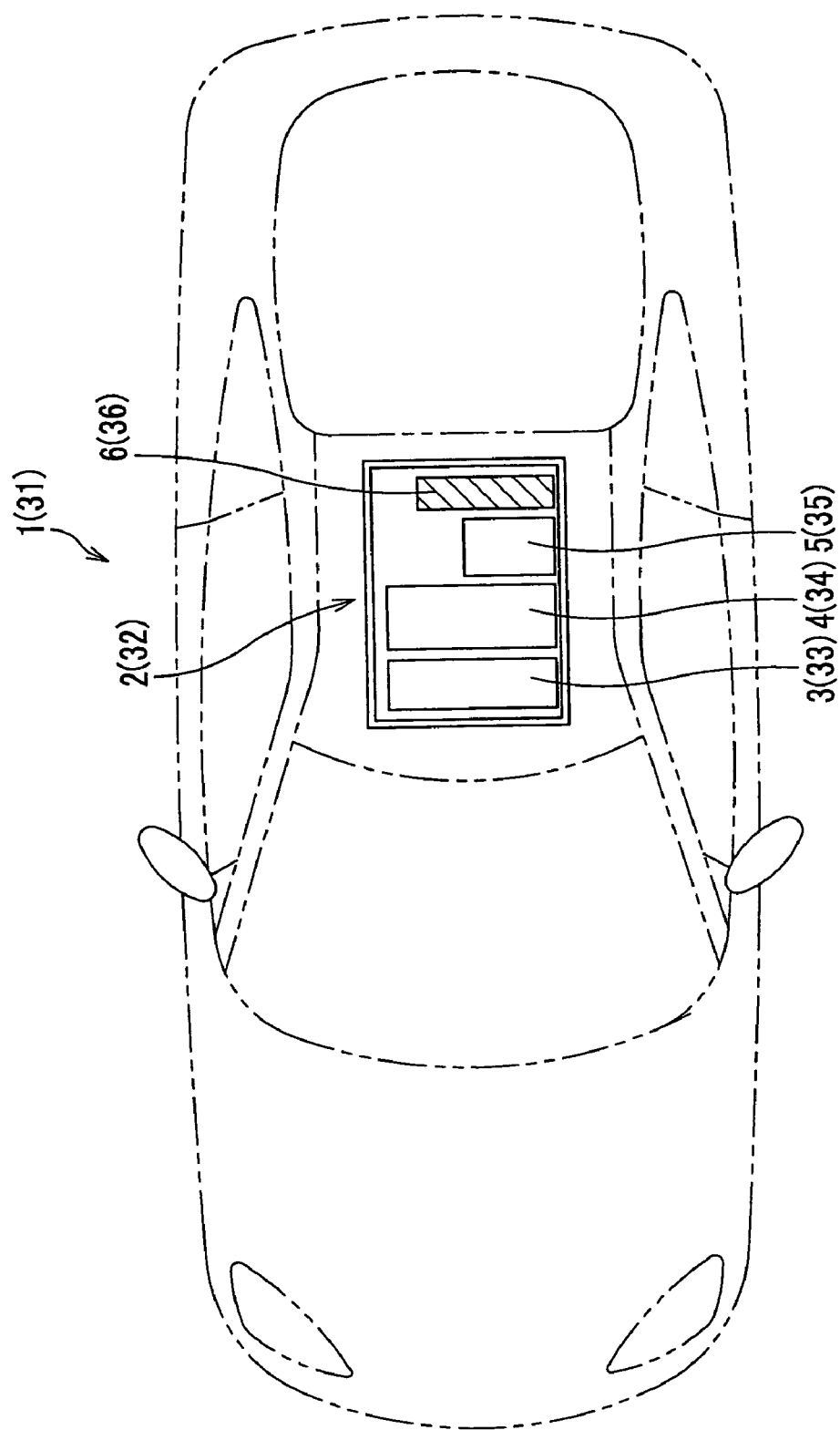
FIG. 1 is a plan view illustrating an electric vehicle equipped with an exhaust gas processing device for a fuel cell according to the present invention.

As shown in FIG. 1, an electric vehicle 1 equipped with a fuel cell (hereinafter simply referred to as a "vehicle") mounts a fuel cell system box 2 under a central part of the floor. A fuel cell system is arranged in the fuel cell system box 2, in order of a temperature regulator 3, a fuel cell stack 4, a humidifier 5, and an exhaust fuel diluter 6 from the front to the rear of the vehicle 1. The fuel cell system further includes a non-illustrated radiator for cooling the fuel cell stack 4, a high pressure hydrogen storage tank, etc.

The fuel cell stack 4 generates electricity by feeding hydrogen stored in the high pressure hydrogen storage tank as a fuel and air taken from the external of the vehicle 1, so as to drive the vehicle 1. The fuel cell stack 4 generates product water (hereinafter simply referred to as "water") during the generation of electricity. To reliably operate the fuel cell stack 4, the temperature regulator 3 adjusts temperatures of hydrogen and air that are fed to the fuel cell stack 4, and the humidifier 5 humidifies hydrogen and air that are fed to the fuel cell stack 4. The discharged fuel diluter 6 is an exhaust gas processing device for a fuel according to the present invention, in which discharged purged hydrogen from the anode piping system is retained, and thereafter mixed with and diluted by discharged air prior to being discharge to the atmosphere together with water.

In order to improve the utilization efficiency (fuel economy) hydrogen once used in the fuel cell stack 4 is returned to the upstream of the humidifier 5 through a recirculation pipe 7 to form a recirculation system. Further, because the concentration of impurities becomes higher or water produced by the generation of electricity retains in the fuel cell stack 4 after a long-term recirculation of hydrogen, in order to purge such hydrogen and water, a purge pipe 8 branched off from the recirculation pipe 7 is connected to the discharged fuel diluter 6. A switch valve 9 that is automatically or manually operated is provided in the purge pipe 8. The purge pipe 8 is normally closed, but is open during purging.

Further, in order to dilute and discharge drainage from the anode of the fuel cell stack 4 and drainage from the humidifier 5, an anode drain pipe 10 and a humidifier drain pipe 11 are connected to the discharged fuel diluter 6. A switch valve 12, 13 that is automatically or manually operated is provided in the anode drain pipe 10 and the humidifier drain pipe 11, respectively.

Further, in order to discharge cathode exhaust gas from the fuel cell stack 4, a cathode exhaust gas pipe 14 is connected to the discharged fuel diluter 6.

The fuel cell system box 2 is constructed accordingly. Purged hydrogen discharged into the exhaust fuel diluter 6 retains in the diluter 6 for a while and disperses with its volume expanded. Because the cathode exhaust gas pipe 14 extends through the exhaust fuel diluter 6 and discharged air flows in the cathode exhaust gas pipe 14, the purged hydrogen retained in the exhaust fuel diluter 6 is drawn from suction holes 17, 17 and is mixed with discharged air. The purged hydrogen is therefore diluted to a lower concentration and is discharged to the atmosphere. Condensed water contained in discharged air from the humidifier 5 or the fuel cell stack 4 is also discharged together with discharged air. A reference numeral 15 denotes a back fire filter.

Figure 3:
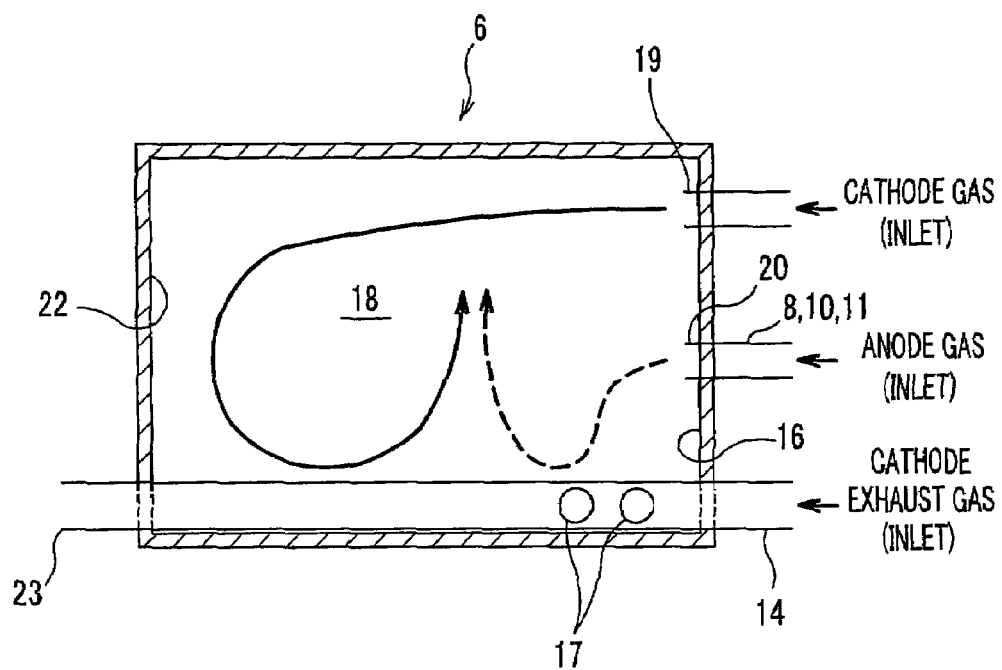
FIG. 3 is a sectional view of the exhaust gas processing device.

With reference to FIG. 3, the exhaust gas processing will be described in detail.

Figure 2:
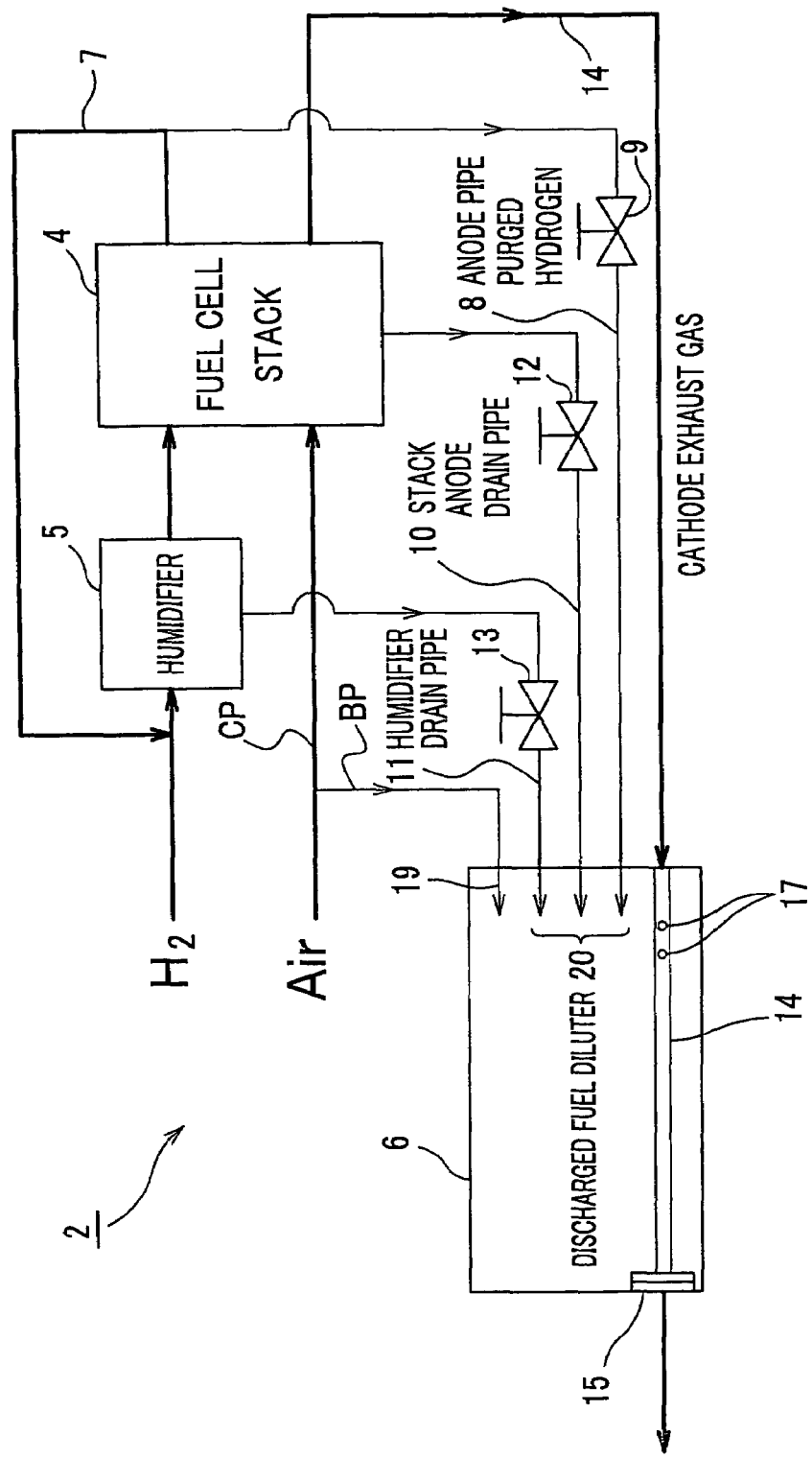
FIG. 2 is a block diagram illustrating a fuel cell system box according to a first embodiment of the present invention.

The discharged fuel diluter 6 is a box-like container having a wall 16. Provided at the upper part of the wall 16 is an agitating gas introduction inlet 19 for introducing cathode gas (see Air shown in FIG. 2) that is partly branched off from cathode gas before feeding to the fuel cell stack 4. Further, an inlet 20 is provided in the wall 16 at a position lower than the agitating gas introduction inlet 19, and purged hydrogen discharged from the purge pipe 8, the anode drain pipe 10, and the humidifier drain pip 11 (FIG. 2) are combined and introduced from the inlet 20. The discharged fuel diluter 6 forms there in a reservoir 18 for retaining discharged hydrogen that is introduced from the inlet 20.

A cathode exhaust gas pipe 14, through which discharged air from the cathode exhaust gas pipe system flows, extends horizontally through the walls 16, 22 at the lower part of the discharged fuel diluter 6. The diameter of the exhaust gas pipe 14 is smaller within the reservoir 18 than the diameter at the upstream of the discharged fuel diluter 6. The outlet 23 opens to the atmosphere. Suction holes 17, 17 are formed in the cathode exhaust gas pipe 14 at a position close to the wall 16. The suction holes 17, 17 are for sucking and mixing purged hydrogen. In this preferred embodiment, two suction holes 17, 17 are formed to improve the suction efficiency. However, the number of suction holes 17 may vary to the suitable number.

The pressure of cathode gas introduced from the agitating gas introduction inlet 19 to the reservoir 18 is set to be slightly higher than the pressure of cathode exhaust gas flowing through the cathode exhaust gas pipe 14.

According to this discharged fuel diluter 6, high concentration purged hydrogen (anode gas) that is introduced from the anode pipe system (the purge pipe 8, the anode drain pipe 10, and the humidifier drain pipe 11) through the inlet 20 and into the reservoir 18 retains in the reservoir 18 with its volume expanded. At the same time, a part of cathode gas flows into the reservoir 18 through a branch pipe BP, which is branched off from the cathode gas pipe CP for feeding cathode gas to the fuel cell stack 4 and extends to the agitating gas introduction inlet 19. Therefore, the purged hydrogen retained in the reservoir 18 is mixed with and diluted by cathode gas, leading to decreased deviation of the concentration within the reservoir 18.

By horizontally exhausting cathode gas, the specific gravity of which is higher than purged hydrogen, from the agitating gas introduction inlet 19 provided at the upper part of the reservoir 18, and by introducing purged hydrogen, the specific gravity of which is low and which is likely to flow upward of the reservoir 18, from the inlet 20 positioned lower than the agitating gas introduction inlet 19, cathode gas flows against the opposite wall 22 and flows downward of the reservoir 18. Therefore, cathode gas and purged hydrogen are sufficiently agitated and mixed together.

Next, together with water retained in the reservoir 18, high pressure purged hydrogen within the reservoir 18 is drawn from the suction holes 17, 17 that are provided in the cathode exhaust gas pipe 14 where cathode discharged air with a high flow velocity and with a low pressure is flowing, into the cathode exhaust gas pipe 14. The purged hydrogen is then mixed with and diluted by the cathode discharged air flowing through the cathode exhaust gas pipe 14 at a high speed, and is discharged to the atmosphere through the outlet 23 in a manner drawn by a flow of the cathode discharged air. Therefore, the purged hydrogen is sufficiently diluted prior to being discharged to the atmosphere.

Figure 4:
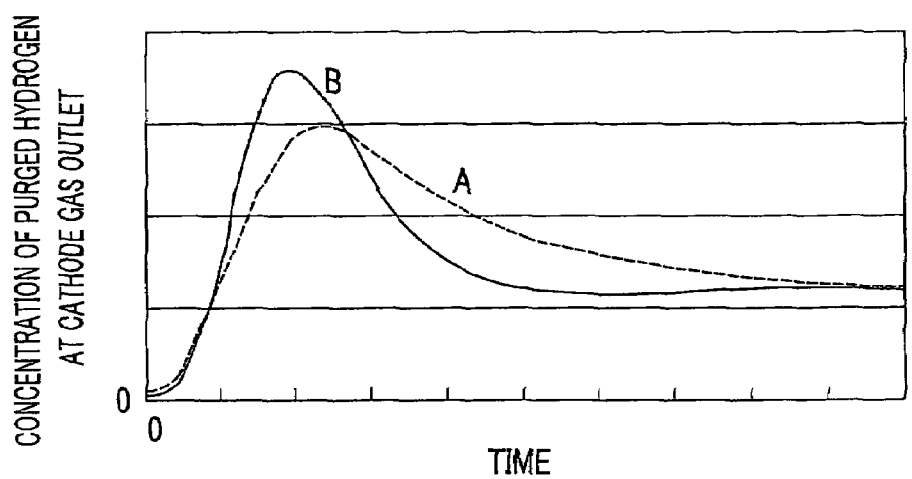
FIG. 4 is a graph explaining a change in concentration of purged hydrogen with elapse of time, at the cathode gas discharging portion of the exhaust gas processing device.

In this event, change in the concentration of purged hydrogen at the outlet (cathode gas outlet) 23 is shown by the line A of FIG. 4. Even if purged hydrogen is intermittently introduced into the reservoir 18, not like the change B in the concentration of purged hydrogen in the conventional diluter, it is possible to prevent high concentration purged hydrogen from being discharged to the atmosphere. Therefore, when compared with the conventional diluter, it is possible to discharge relatively stable purged hydrogen without a large concentration change.

Second Embodiment

With reference to FIG. 1 and FIGS. 5 through 8, a second embodiment of the present invention will be described below.

Figure 5:
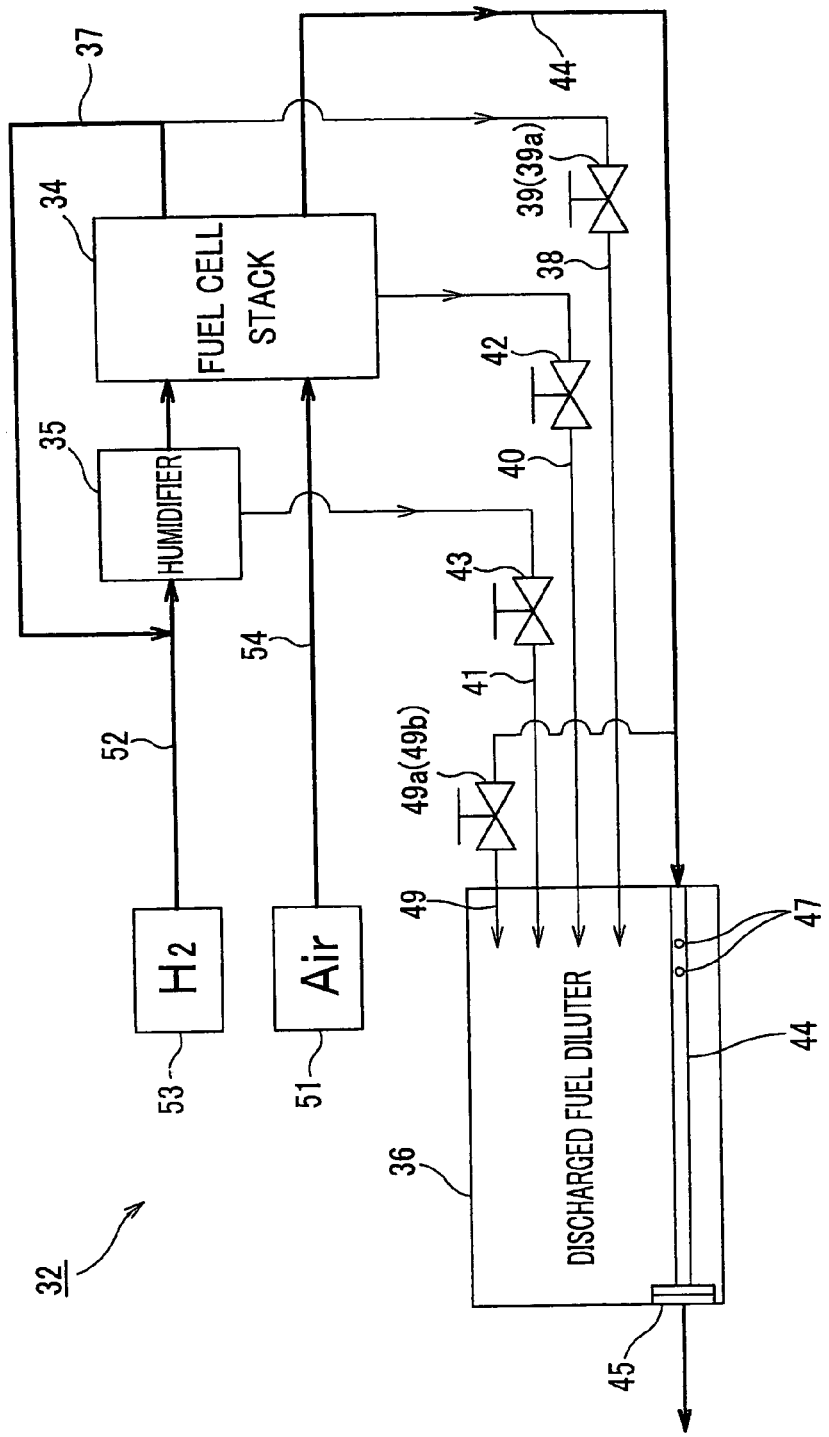
FIG. 5 is a block diagram illustrating a fuel cell system box according to a second embodiment of the present invention.
Figure 6:
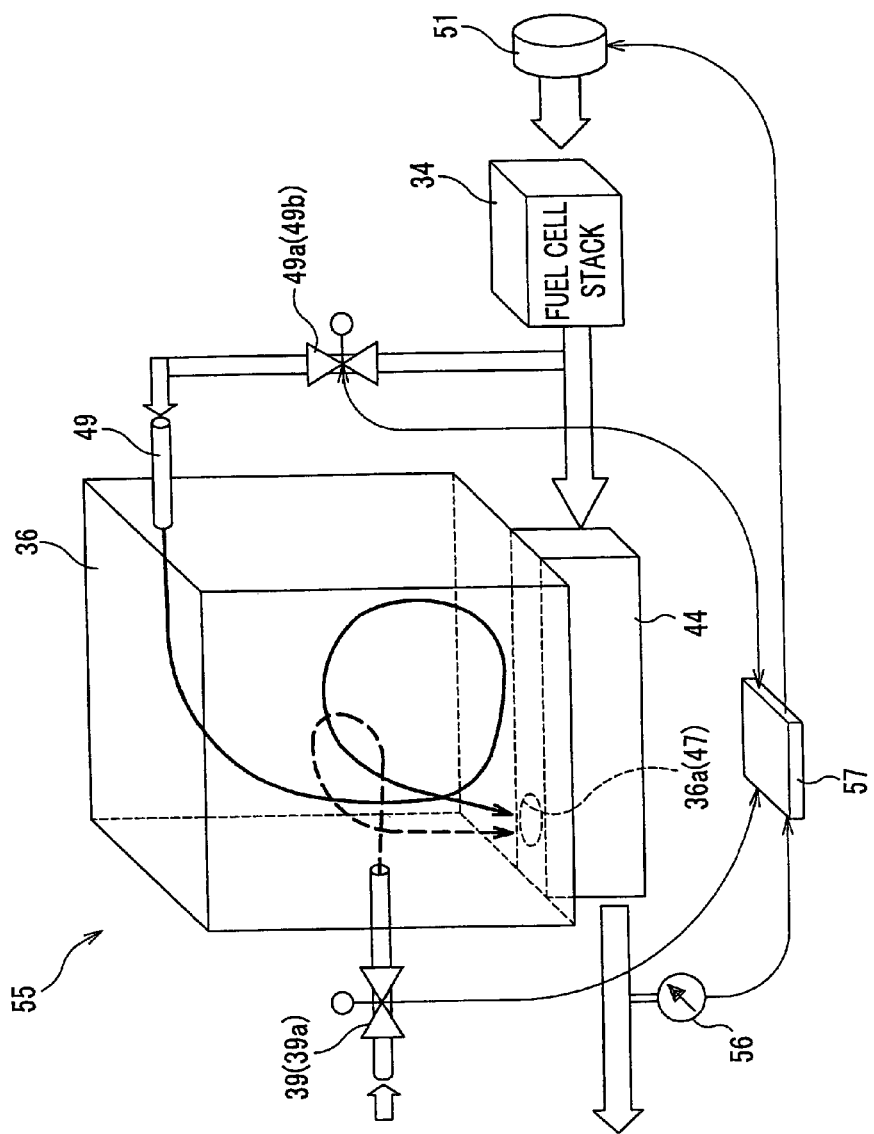
FIG. 6 schematically explains movements of agitating air and purged hydrogen within the exhaust fuel diluter.

Herein, FIG. 6 schematically illustrates respective construction parts to explain movements of agitating air and purged hydrogen, and relative positions of these construction parts are not restricted to this specific embodiment. Especially, a discharged fuel diluter 36 and an exhaust gas pipe 44 may be formed such that the exhaust gas pipe 44 extends through the discharged fuel diluter 36 as illustrated in FIG. 5 or the exhaust gas pipe 44 is connected to the discharged fuel diluter 36 at the lower end thereof as illustrated in FIG. 6.

As shown in FIG. 1, the vehicle 31 mounts a fuel cell system box 32 under a central part of the floor. A fuel cell system is arranged in the fuel cell system box 32, in order of a temperature regulator 33, a fuel cell stack 34, a humidifier 35, and an exhaust fuel diluter 36 from the front to the rear of the vehicle 31. The fuel cell system further includes a non-illustrated radiator for cooling the fuel cell stack 34, a high pressure hydrogen storage tank 53 and a compressor (flow rate adjusting means) 51 for adjusting the amount of discharged air shown in FIG. 5, etc.

As shown in FIG. 5, the fuel cell stack 34 generates electricity by an electrochemical reaction between hydrogen stored in the high pressure hydrogen storage tank 53 as a fuel and air supplied from the compressor 51 (hereinafter referred to as "supply air").

Connected at the lower part of the fuel cell stack 34 is an anode drain pipe 40 for discharging drainage, such as water, to be produced during the generation of electricity. Drainage is discharged into the discharged fuel diluter 36 through the anode drain pipe 40. A manually or automatically operated switch valve 42 is arranged in the anode drain pipe 40. By opening or closing the switch valve 42, water produced in the fuel cell stack 34 flows toward the discharged fuel diluter 36.

At the anode side of the fuel cell stack 34, a hydrogen supply pipe 52 for feeding hydrogen from the high-pressure hydrogen storage tank 53 is connected to the inlet, and a recirculation pipe (recirculation system) 37 for returning hydrogen to the fuel cell stack 34 is connected to the outlet. Connected to the recirculation pipe 37 is a purge pipe 38, through which impurities contained in hydrogen retained in the recirculation pipe 37 or hydrogen which contains water produced in the fuel cell struck 34 are discharged. Hydrogen in the recirculation pipe 37 is intermittently purged (discharged) into the discharged fuel diluter 36 when a purge valve 39 arranged in the purge pipe 38 is open and closed at a certain interval based on a signal from a controller 57 to be described later.

At the cathode side of the fuel cell stack 34, an air supply pipe 54 for feeding supply air from the compressor 51 is connected to the inlet, and an exhaust gas pipe 44 for introducing air discharged from the fuel cell stack 34 (hereinafter referred to as "discharged air (cathode exhaust gas)") to the external is connected to the outlet. The exhaust gas pipe 44 extends under the discharged fuel diluter 36 so that discharged air flowing through the exhaust gas pipe 44 is guided to the external flowing under the discharged fuel diluter 36. At least one suction hole 47 (two suction holes are shown in FIG. 5) is formed in the exhaust gas pipe 44. The suction hole 47 is for drawing mixture containing hydrogen or water within the discharged fuel diluter 36. An agitating gas pipe 49 is branched off from the exhaust gas pipe 44 at the upstream of the discharged fuel diluter 36 and extends to the upper part of the discharged fuel diluter 36. A part of discharged air flowing through the exhaust gas pipe 44 is guided to the upper part of the discharged fuel diluter 36 as agitating air. Aback fire filter 45 is arranged at the outlet of the exhaust gas pipe 44.

A humidifier 35 is arranged in the hydrogen supply pipe 52 at an appropriate position, and a humidifier drain pipe 41 is connected to the lower part of the humidifier 35 for discharging drainage such as water into the discharged fuel diluter 36. A manually or automatically operated switch valve 43 is arranged in the humidifier drain pipe 41, and by opening or closing the switch valve 42, drainage in the humidifier 35 flows toward the discharged fuel diluter 36. Although not shown in the drawings, the air supply pipe 54 is also provided with a humidifier 35, a humidifier drain pipe 41, and a switch valve 43, so that drainage in the humidifier 35 can be discharged into the discharged fuel diluter 36.

The discharged fuel diluter 36 is a container having a reservoir, in which purged hydrogen that is intermittently purged from the recirculation pipe 37 is temporally retained. The discharged fuel diluter 36 is a main part of an exhaust gas processing device 55 to be described later. Provided in the bottom portion of the discharged fuel diluter 36 is a communication hole 36a (see FIG. 6) that is in communication with the suction hole 47 of the exhaust gas pipe 44.

As shown in FIG. 6, the exhaust gas processing device 55 includes the discharged fuel diluter 36, the agitating gas pipe 49, the exhaust gas pipe 44, and the compressor 51. Further, the exhaust gas processing device 55 includes an adjustment valve 49a, an air amount detector 49b, a hydrogen concentration detector 56, and a controller 57. The adjustment valve 49a is arranged in the agitating gas pipe 49 at an appropriate position. The adjustment valve 49a controls the opening degree based on a signal transmitted from the controller 57, thereby adjusting the amount of agitating air.

The air amount detector 49b is provided in the interior of the adjustment valve 49a. The air amount detector 49b detects the opening degree of the valve to thereby detect the amount of agitating air introduced into the discharged fuel diluter 36, and outputs the detection signal to the controller 57. The hydrogen concentration detector 56 is provided at the outlet side of the exhaust gas pipe 44, specifically at the downstream of the suction hole 47. The hydrogen concentration detector 56 detects the hydrogen concentration of mixture made by mixing discharged air and hydrogen drawn from the suction hole 47 (hydrogen concentration after the dilution of discharged air), and outputs the detection signal to the controller 57.

The controller 57 controls the opening degree of the adjustment valve 49a based on the detection signal from the hydrogen concentration detector 56, and also controls the rotational speed of the compressor 51 based on the detection signals from the air amount detector 49b and the hydrogen concentration detector 56. Further, the controller 57 transmits a signal to the purge valve 39 at a time when the fuel cell defectively generates electricity (decreased voltage generation) or at a predetermined time interval to open the purge valve 39, thereby discharging hydrogen. When the controller 57 transmits a signal to the purge valve 39, the controller 57 determines that hydrogen is purged, and controls the adjustment valve 49a in response to the execution of purging so as to control the introduction of agitating air into the discharged fuel diluter 36. To be more specific, the controller 57 performs a control according to the control flow shown in FIG. 7.

Figure 7:
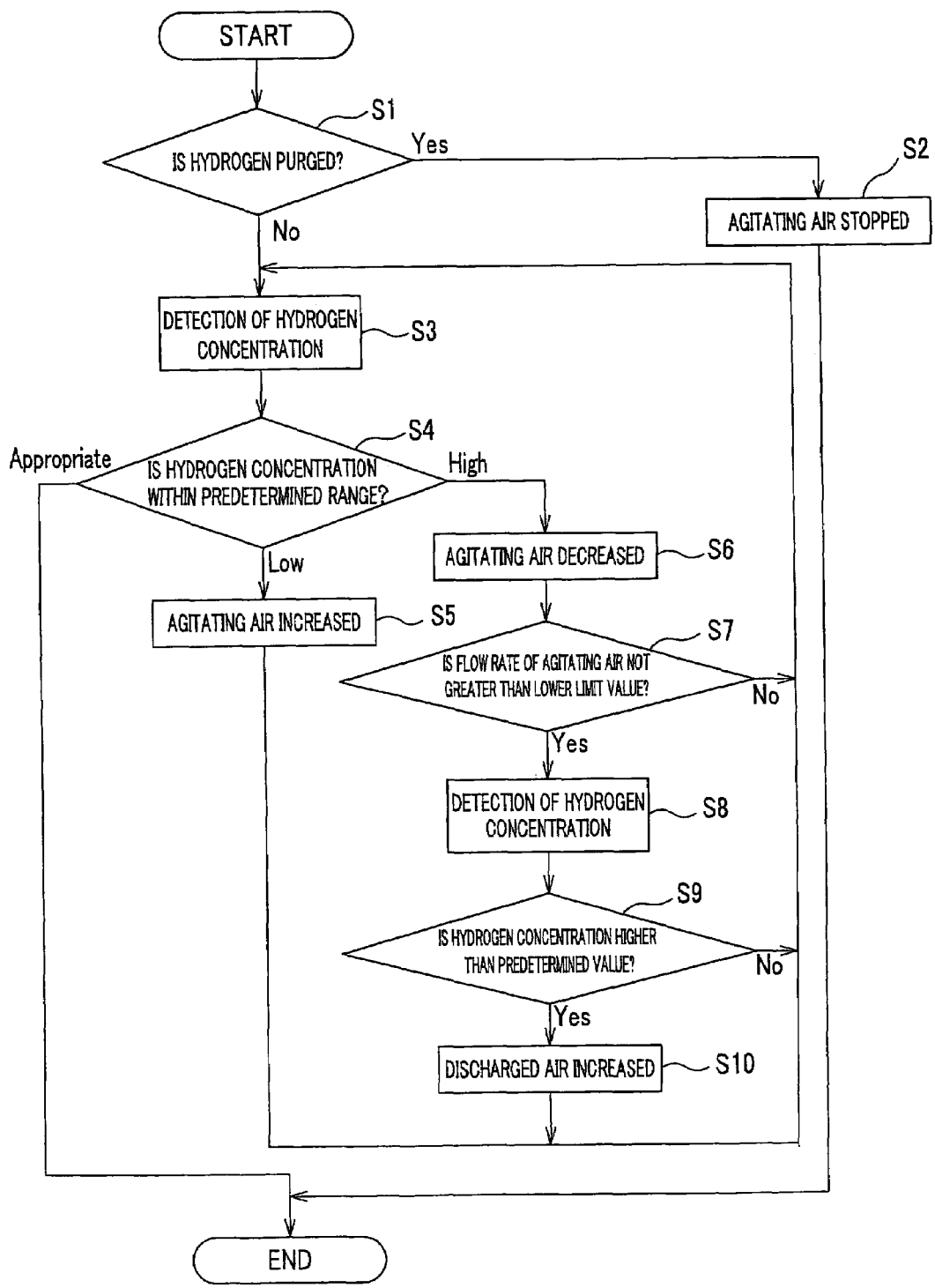
FIG. 7 is a control flow showing manner of processing purged hydrogen by the exhaust gas processing device according to the second embodiment of the present invention.

With reference to FIGS. 6 and 7, method of processing purged hydrogen by the exhaust gas processing device 55 will be described.

At first, a determination is made as to whether hydrogen is purged from the recirculation pipe 37 (step S1). The purging process is repeatedly carried out at a time when the voltage of generated electricity lowers or at a predetermined time interval (e.g. at every 5 to 10 second). If purged hydrogen is detected in step S1 (Yes), the controller 57 closes the adjustment valve 49a so that a supply of agitating air to the discharged fuel diluter 36 is stopped (step S2). By this operation, the pressure within the discharged fuel diluter 36 lowers equal to or lower than a predetermined value, so that purged hydrogen is sufficiently drawn into the discharged fuel diluter 36.

If hydrogen is not purged in step S1 (No), the hydrogen concentration detector 56 detects the hydrogen concentration (step S3), and the controller 57 determines whether the detected hydrogen concentration is within a predetermined range, for example, in the range from 1 to 1.5% (step S4). If the hydrogen concentration is within the predetermined range in step S4, the control is completed.

If the hydrogen concentration is determined to be lower than the predetermined range in step S4, the controller 57 determines that hydrogen, the specific gravity of which is lower than air, retains at the upper part of the discharged fuel diluter 36 and thus the amount of hydrogen drawn from the suction hole 47 becomes smaller. In this instance, the controller 57 opens the adjustment valve 49a for a certain amount to increase the flow rate of agitating air introduced into the discharged fuel diluter 36 (step S5). Purged hydrogen is then drawn from the suction hole 47. Thereafter, operation returns to step S3 to detect the hydrogen concentration, and then to step S4 to determine whether the hydrogen concentration is within the predetermined range. If the hydrogen concentration increases to the predetermined range by the increased amount of agitating air, the control is completed.

As shown in FIG. 7, if the hydrogen concentration is determined to be higher than the predetermined range in step S4, the controller 57 determines that too much hydrogen is drawn from the suction hole 47 because of agitating air. In this instance, the controller 57 closes the adjustment valve 49*a* for a certain amount to decrease the flow rate of agitating air introduced into the discharged fuel diluter 36 (step S6). Next, based on the detection signal from the air amount detector 49*b*, the controller 57 determines whether the flow rate of agitating air is not greater than the lower limit value (e.g. zero) (step S7). If the flow rate of agitating air is greater than the lower limit value (No), operation returns to step S3 to detect the hydrogen concentration, and then to step S4 to determine whether the hydrogen concentration is within the predetermined range.

If the controller 57 determines that the flow rate of agitating air is not greater than the lower limit value (Yes) in step S7, the hydrogen concentration detector 56 detects the hydrogen concentration again (step S8) and a determination is made as to whether the hydrogen concentration is higher than a predetermined value (e.g. 1.5%) (step S9). If the controller 57 determines that the hydrogen concentration is not greater than the predetermined value (No) in step S9, operation again returns to step S3 and step S4. However, because the hydrogen concentration is within the predetermined range in step S4, the control is completed.

If the controller 57 determines that the hydrogen concentration is greater than the predetermined value (Yes) in step S9, because it is impossible to decrease the amount of agitating air any longer, the controller 57 increases the rotational speed of the compressor 51 so as to increase the amount of discharged air to be mixed with hydrogen that is introduced from the suction hole 47 (step S10). The hydrogen concentration is therefore decreased. When operation returns to step S3 and step S4, if the hydrogen concentration decreases to the predetermined range because of the increased discharged air, the control is completed.

Figure 8B:
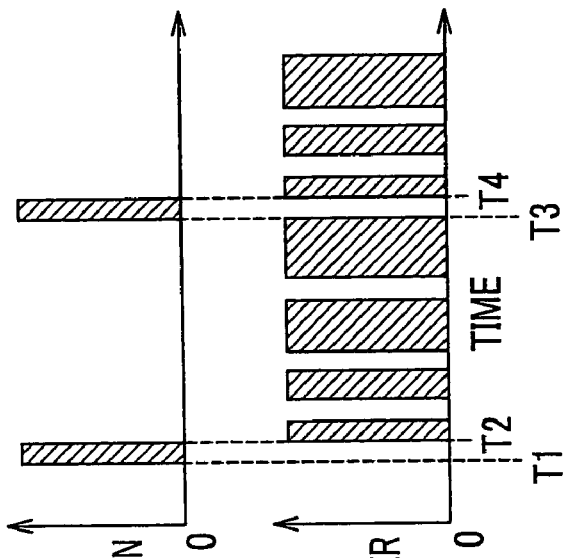
FIG. 8B is a time chart explaining changes in agitating air and purged hydrogen that are adjusted by adjustment valves according to another embodiment.
Figure 8A:
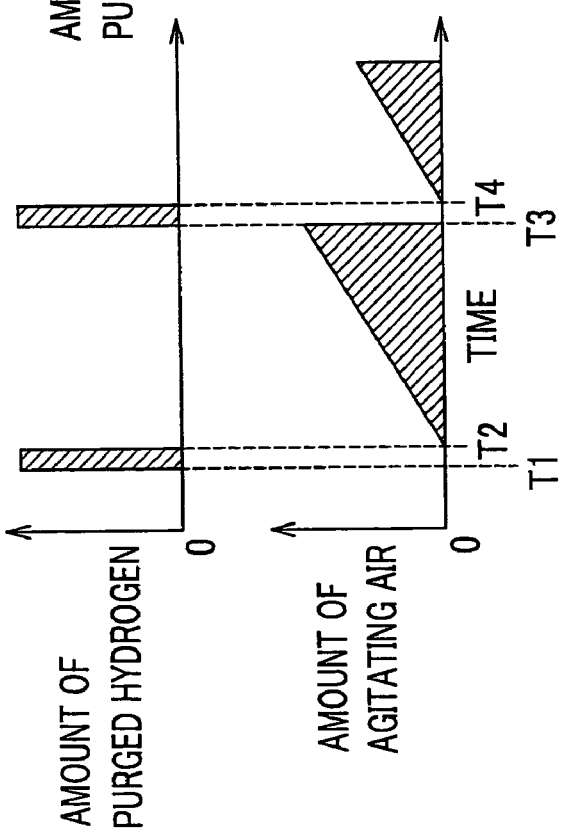
FIG. 8A is a time chart explaining changes in agitating air and purged hydrogen that are adjusted by adjustment valves according to the second embodiment of the present invention.

FIGS. 8A and 8B respectively show a time chart explaining changes in purged hydrogen and agitating air. As shown in the figures, a supply of agitating air is not permitted during purging (time intervals between T1 and T2 and between T3 and T4), and the amount of agitating air is increased or decreased according to the detection value of the hydrogen concentration at a time when the purging is not executed (time interval between T2 and T3). The hydrogen concentration is likely to increase greater than the predetermined value because a supply of agitating air is stopped (the amount of agitating air is zero) just after the purging is completed (T2, T4). Therefore, the amount of agitating air gradually increases. Herein, FIG. 8A shows the instance where a linear valve is used as the adjustment valve 49*a*. In this instance, a supply of agitating air increases continuously. Meanwhile, FIG. 8B shows the instance where a duty valve is used as the adjustment valve 49*a*. In this instance, the ON/OFF ratio of the valve 49*a* increases gradually.

According to the exhaust gas processing device according to the second embodiment of the present invention, the following advantages can be obtained.

(1) Because the controller 57 controls the adjustment valve 49*a* based on the detection signal from the hydrogen concentration detector 56 so that the amount of hydrogen drawn into the exhaust gas pipe 44 can be adjusted by way of controlling the amount of agitating air, it is possible to control the hydrogen concentration of mixture that is discharged to the external within the predetermined range. To be more specific, by retaining the hydrogen concentration of hydrogen that is discharged to the atmosphere not greater than the predetermined lower limit value and by mixing and diluting as much purged hydrogen as possible, it is possible to improve the threshold value of the amount of hydrogen that is purged from the fuel cell. Further, because increased amount of hydrogen can be purged off when generation of electricity is unstable such as in the case of decreased voltage generation or start up of generation of electricity, it is possible to control generation of electricity in a stable manner.

(2) Even if controlling the adjustment valve 49*a* does not allow the hydrogen concentration of mixture that is discharged to the external to be lower, because the amount of discharged air can be increased by controlling the compressor 51, it is possible to control the hydrogen concentration of the mixture within the predetermined range.

(3) Because the adjustment valve 49*a* can be controlled in response to the operation of the purge valve 39 so as to decrease the pressure within the discharged fuel diluter 36, it is possible to sufficiently introduce purged hydrogen into the discharged fuel diluter 36.

While the present invention has been described in detail with reference to specific embodiments thereof, it will be apparent to one skilled in the art that various changes and modifications may be made without departing from the scope of the claims.

What is claimed is:

1. An exhaust gas processing device for a fuel cell, in which hydrogen gas intermittently purged from the fuel cell is mixed with cathode exhaust gas from the fuel cell and diluted prior to being discharged to an atmosphere, the exhaust gas processing device comprising:
    a reservoir in which purged hydrogen gas from the fuel cell is retained and mixed with the cathode exhaust gas from the fuel cell;
    an agitating gas introduction inlet provided at an upper part of the reservoir;
    wherein the purged hydrogen gas is mixed with and diluted by agitating gas introduced from the agitating gas introduction inlet; and
    an exhaust gas pipe adapted to carry the cathode exhaust gas discharged from the fuel cell, wherein said exhaust gas pipe extends through a lower part of the reservoir and includes at least one hole positioned within the reservoir;
    wherein a pressure of the cathode exhaust gas flowing through the exhaust gas pipe is lower at the reservoir than a pressure in the reservoir.

2. An exhaust gas processing device for a fuel cell according to claim 1, wherein the agitating gas comprises cathode gas to be supplied to the fuel cell.

3. An exhaust gas processing device for a fuel cell according to claim 1, wherein the agitating gas comprises cathode gas supplied from a branch pipe that is branched off from a cathode gas pipe for supplying cathode gas to the fuel cell.

4. An exhaust gas processing device for a fuel cell according to claim 1, wherein the exhaust gas pipe includes a smaller diameter portion disposed within the reservoir.

5. An exhaust gas processing device for a fuel cell according to claim 1, wherein the agitating gas comprises at least in part cathode exhaust gas to be discharged from the fuel cell.

6. An exhaust gas processing device for a fuel cell, in which hydrogen gas purged from the fuel cell is mixed with cathode exhaust gas from the fuel cell and diluted prior to being discharged to an atmosphere, the exhaust gas processing device comprising:
a reservoir in which purged hydrogen gas from the fuel cell is retained and mixed with cathode exhaust gas from the fuel cell; and
an agitating gas introduction inlet provided at an upper part of the reservoir;
wherein the purged hydrogen gas is mixed with and diluted by agitating gas introduced from the agitating gas introduction inlet, wherein the agitating gas comprises at least in part cathode exhaust gas to be discharged from the fuel cell, and wherein the agitating gas comprises cathode exhaust gas supplied from an agitating gas pipe that is branched off from an exhaust gas pipe adapted to carry cathode exhaust gas discharged from the fuel cell.

7. An exhaust gas processing device for a fuel cell according to claim 6, further comprising an adjustment valve provided in the agitating gas pipe and for adjusting an amount of agitating gas, a hydrogen concentration detector for detecting a hydrogen concentration of emission gas discharged to the atmosphere, and a controller for controlling the adjustment valve based on a detection signal from the hydrogen concentration detector.

8. An exhaust gas processing device for a fuel cell according to claim 7, wherein the controller controls a flow rate adjusting mechanism to increase an amount of cathode exhaust gas when the amount of agitating gas introduced to the reservoir is not greater than a lower limit value and the hydrogen concentration is higher than a predetermined value.

9. An exhaust gas processing device for a fuel cell according to claim 6, wherein the exhaust gas pipe extends under the reservoir, and wherein a communication hole provided in a bottom portion of the reservoir is in communication with a suction hole provided in the exhaust gas pipe.

10. An exhaust gas processing device for a fuel cell according to claim 7, wherein the adjustment valve comprises one of a linear valve and a duty valve.

11. An exhaust gas processing device for a fuel cell according to claim 8, wherein the flow rate adjusting mechanism comprises one of a compressor which can feed air in accordance with rotational speed and a flow regulating valve which can adjust a flow rate.

12. An exhaust gas processing device for a fuel cell according to claim 6, further comprising an adjustment valve provided in the agitating gas pipe and for adjusting an amount of agitating gas, and wherein introduction of agitating gas is controlled in response to purging from the fuel cell.

13. An exhaust gas processing device for a fuel cell according to claim 12, further comprising a recirculation pipe extending from an outlet to an inlet of the fuel cell and recirculating unreacted hydrogen, a purge pipe connected to the recirculation pipe and discharging impurities or water within the recirculation pipe, and a purge valve provided in the purge pipe, wherein the purge valve is open and closed based on a signal from the controller.

14. An exhaust gas processing device for a fuel cell according to claim 13, wherein the controller opens the purge valve at a time when generated voltage lowers or at every predetermined interval.

15. An exhaust gas processing device for a fuel cell, in which hydrogen gas purged from the fuel cell is mixed with cathode exhaust gas from the fuel cell and diluted prior to being discharged to an atmosphere, the exhaust gas processing device comprising:
a reservoir having an inlet through which purged hydrogen gas from the fuel cell is introduced into the reservoir and then mixed with the cathode exhaust gas from the fuel cell; and
an agitating gas introduction inlet provided at an upper part of the reservoir;
wherein the cathode exhaust gas to be supplied to the fuel cell is supplied to the agitating gas introduction inlet; and
an exhaust gas pipe adapted to carry the cathode exhaust discharged from the fuel cell, wherein said exhaust gas pipe extends through a lower part of the reservoir and includes at least one hole positioned within the reservoir;
wherein a pressure of the cathode exhaust gas flowing through the exhaust gas pipe is lower at the reservoir than pressure in the reservoir.

16. An exhaust gas processing device for a fuel cell comprising:
an exhaust fuel diluter having a reservoir in which hydrogen gas purged from the fuel cell is retained and then mixed with cathode exhaust gas from the fuel cell and diluted prior to being discharged to an atmosphere;
an agitating gas pipe for introducing agitating gas which agitates the hydrogen gas retained in the reservoir;
an adjustment valve for adjusting an amount of agitating gas supplied to the reservoir;
a hydrogen concentration detector for detecting a hydrogen concentration of emission gas discharged to the atmosphere;
a controller for adjusting the adjustment valve based on a detection signal from the hydrogen concentration detector; and
an exhaust gas pipe adapted to carry the cathode exhaust gas discharged from the fuel cell, wherein said exhaust gas pipe extends through a lower part of the reservoir and includes at least one hole positioned within the reservoir;
wherein a pressure of the cathode exhaust gas flowing through the exhaust gas pipe is lower at the reservoir than a pressure in the reservoir.

17. An exhaust gas processing device for a fuel cell according to claim 16, wherein the controller controls a flow rate adjusting means to increase an amount of cathode exhaust gas in a case where an amount of agitating gas to be supplied to the exhaust fuel diluter is not greater than a lower limit value and the hydrogen concentration is determined to be higher than a predetermined value.

18. An exhaust gas processing device for a fuel cell comprising:
an exhaust fuel diluter having a reservoir in which hydrogen gas purged from the fuel cell is retained and then mixed with cathode exhaust gas from the fuel cell and diluted prior to being discharged to an atmosphere;
an agitating gas pipe for introducing agitating gas which agitates the hydrogen gas retained in the reservoir;

an adjustment valve for adjusting an amount of agitating gas supplied to the reservoir;

wherein an introduction of agitating gas is controlled in response to a hydrogen concentration of the hydrogen gas retained in the reservoir when an execution of purging the hydrogen gas from the fuel cell is not detected; and an exhaust gas pipe adapted to carry the cathode exhaust gas discharged from the fuel cell, wherein said exhaust gas pipe extends through a lower part of the reservoir and includes at least one hole positioned within the reservoir;

wherein a pressure of the cathode exhaust gas flowing through the exhaust gas pipe is lower at the reservoir than a pressure in the reservoir.

* * * * *